United States Patent [19]

Fiore et al.

[11] Patent Number: 4,874,838

[45] Date of Patent: Oct. 17, 1989

[54] LIQUID CRYSTAL COPOLYETHERS FROM 7-OXA-BICYCLO-(2,2,1)-HEPTANE

[75] Inventors: Leonardo Fiore, Milan; Giuseppe Motroni, Novara; Mauro Maritano, Como, all of Italy

[73] Assignee: Montedison S.p.A., Milan, Italy

[21] Appl. No.: 95,596

[22] Filed: Sep. 11, 1987

[30] Foreign Application Priority Data

Sep. 15, 1986 [IT] Italy ................. 21697 A/86

[51] Int. Cl.4 .................. C08G 65/08; C08G 65/24
[52] U.S. Cl. ..................... 528/408; 528/409; 528/412; 528/417
[58] Field of Search ............. 528/408, 409, 412, 417

[56] References Cited

U.S. PATENT DOCUMENTS 3,417,033 12/1968 Weissermel et al. ............. 528/417

Primary Examiner—John Kight
Assistant Examiner—Frederick Krass
Attorney, Agent, or Firm—Stevens, Davis, Miller & Mosher

[57] ABSTRACT

The present invention relates to copolyethers comprising copolymers of 7,oxa-bicyclo(2,2,1)heptane, and its alkyl-derivatives, with one or more cycloaliphatic ethers, comprising from 2 to 4 carbon atoms in their ring. These copolyethers show an anisotropic behavior in the molten state, and therefore have liquid-crystal properties.

7 Claims, No Drawings

LIQUID CRYSTAL COPOLYETHERS FROM 7-OXA-BICYCLO-(2,2,1)-HEPTANE

FIELD OF THE INVENTION

The present invention relates to liquid-crystal copolyethers, and to a process for preparing them.

More precisely, it relates to copolymers of 7,oxabicyclo(2,2,1)heptane having the formula:

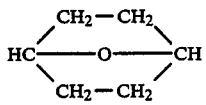

or its derivatives substituted in 2-, 3-, 5-, 6-positions with alkyl radicals having a small number of carbon atoms, with a particular class of alicyclic ethers.

BACKGROUND OF THE INVENTION

The homopolymer of 7,oxa-bicyclo(2,2,1)heptane and of its alkyl-derivatives is known and described in the technical literature. This homopolymer shows a crystallinity at x-rays and is poorly soluble in most common solvents, and has the drawback that its melting temperature, which is generally higher than 350° C., is higher than its decomposition temperature. This set of properties make the homopolymer not very interesting from an industrial viewpoint, due to fabricating difficulties.

The Present Invention

The present applicants discovered that by copolymerizing 7,oxa-bicyclo(2,2,1)heptane of formula (I), or an alkyl-derivative thereof, with particular comonomers, it is possible to obtain copolymers which, besides having a melting point controlled by the amount and type of the comonomer, surprisingly show an anisotropic behavior in the molten state, and hence display liquid-crystal properties.

It is known that polymers having such a behavior show, in the molten state, and within a defined temperature range, an ordered arrangement of the molecular chains, which is maintained in the solid state, giving the solid polymer special properties, such as a high elastic modulus, a high tensile stress and, in general, the typical properties of a fiber-reinforced polymer.

It was furthermore discovered that the copolymers in question show a high crystallinity, which gives the polymer advantageous properties, such as a lower heat distortion, and a higher resistance to attack by solvents.

Therefore, the objects of the present invention are the copolyethers having an anisotropic behavior in the molten state, comprising copolymers of 7,oxa-bicyclo(2,2,1)heptane, or its derivatives substituted in 2-, 3-, 5-, 6-positions with alkyl radicals having a small number of carbon atoms, with one or more alicyclic ether(s) containing from 2 to 4 carbon atoms, selected from those having the general formula:

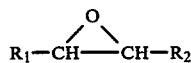

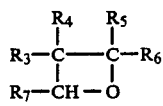

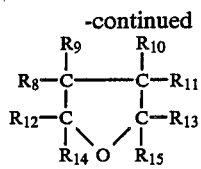

wherein:
$R_1$, $R_2$, the same as or different from each other, represent H, a halogen, an alkyl radical containing a small number of carbon atoms, optionally halogen-substituted, a phenyl of substituted phenyl radical, and wherein
$R_3$, $R_4$, $R_5$, $R_6$, $R_7$, $R_8$, $R_9$, $R_{10}$, $R_{11}$, $R_{12}$, $R_{13}$, $R_{14}$, and $R_{15}$, the same as or different from each other, represent H, a halogen, an alkyl radical containing a small number of carbon atoms, optionally halogen-substituted, with the proviso that at least one of the radicals $R_{12}$, $R_{13}$, $R_{14}$, and $R_{15}$ is hydrogen.

By the term "alkyl radicals containing a small number of carbon atoms," used in the present specification and in the appended claims, alkyl radicals are meant which contain from 1 to 4 carbon atoms.

Cycloaliphatic or alicyclic ethers having the general formula (II), (III), and (IV), wherein $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ are H, Cl, $CH_3$, $C_2H_5$, $CH_2Cl$, $CH_2F$, $CF_3$, and $C_2F_5$, are preferred.

The copolyether of the present invention preferably comprises bicyclo(2,2,1)heptane, or an alkyl-derivative thereof, with one alicyclic ether of formula (II), (III), (IV) only.

The alicyclic ethers are generally present in the copolymer in molar amounts within the range of from 0.1 to 50%, and preferably from 2 to 20%, relative to the total of the monomers.

In general, the copolyethers of the present invention have an inherent viscosity of at least 0.1 dl/g. Inherent viscosities within the range of from 0.3 to 5 dl/g are preferred.

The inherent viscosity is measured at 30° C. in phenol/tetracholoroethane (60/40 by volume) at the concentration of 2.5 g/l.

The copolyethers of the present invention can be prepared according to any known processes, and, in particular, by reacting 7,oxa-bicyclo(2,2,1)heptane, or an alkylderivative thereof, with the cycloaliphatic ether(s), in the presence of a cationic polymerization catalyst. Particularly suitable catalysts are the Lewis acids, such as $BF_3$, $BF_3$ complexed with electron donors (e.g., ethyl ether), pure $FeCl_3$, or $FeCl_3$ in the presence of activators (e.g., $SOCl_2$), $SnCl_4$, and $HClO_4$, etc.

The catalyst is generally present in catalytic amounts within the range of from 0.0001 to 1%, and preferably from 0.001 to 0.5%, by weight, relative to the monomers.

The monomers and the reaction environment are preferably anhydrous, or substantially anhydrous.

The polymerization is preferably carried out in the absence of solvents. In case solvents are used, there can be used, e.g., hydrocarbons (such as benzene or cyclohexane), chlorinated hydrocarbons (such as methylene chloride), or nitroarenes (such as nitrobenzene)

The polymerization temperature is generally within the range of from −20° C. to 120° C., and preferably from 0° C. to 60° C..

The copolyethers of the present invention have liquid-crystal properties, and are particularly suitable for use blended with thermoplastic resins to improve such mechanical properties thereof as the elastic modulus, the tensile strength, and so forth.

Thermoplastic resins which are particularly suitable for this purpose are the thermoplastic polyester resins, ABS resins, polycarbonates, and so forth.

Therefore, a further object of the present invention are articles based on the above copolyethers fabricated under such conditions as to take advantage of the properties derived from the liquid-crystal state.

The following examples are supplied for illustrative purposes, and are not to be construed as being in any way limitative of the invention.

EXAMPLE 1

7-oxa-bicyclo(2,2,1)heptane was purified by refluxing and subsequent distillation over LiAlH$_4$, under a nitrogen atmosphere.

99.7%-pure oxycyclopropane was again distilled and to a glass ampoule, which was previously dried and cooled with liquid nitrogen, the following reactants were charged under a nitrogen atmosphere.

| | |
|---|---|
| 7-oxa-bicyclo(2,2,1)heptane | 5 ml |
| oxacyclopropane | 0.3 ml |
| BF$_3$.Et$_2$O (solution in ether at 20% by volume) | 0.10 ml |

The ampoule is then heat-sealed under high vacuum, heated to 0° C., and the contents thereof kept stirred by magnetic stirring at 0° C. for 4 hours.

The polymerization product was quenched with an equal volume of methanol, containing 1% by volume of NH$_4$OH. The polymer, ground into a powder form, was repeatedly washed with a 20/5/0.5 (by volume) methylene chloride/methanol/NH$_4$OH mixture.

In this way, after drying at 50° C. in vacuo, 4.1 g (yield: 80%) was obtained of a polymer as a white powder.

At x-ray analysis the polymer was shown to be crystalline, and had an inherent viscosity of 1.2 dl/g (measured at the concentration of 2.5 g/l in phenol/tetracholrethane (60/40 by volume) at 30° C.).

Observations by the optical microscope under polarized light between crossed prisms showed the presence of birefringence of the molten material at temperatures higher than the melting temperature, thus confirming the liquid-crystal characteristics of the polymer.

EXAMPLE 2

Epichlorohydrin was purified by storing over activated molecular sieves and subsequent distillation under nitrogen.

To a 50 ml glass reactor previously dried and under nitrogen atmosphere the following reactants were charged:

| | |
|---|---|
| 7-oxa-bicyclo(2,2,1)heptane | 5.0 ml |
| Epichlorohydrin | 0.43 ml |
| PF5 (0.54 M solution in 1,2 dichloroethane/ether 3:1 v/v) | 0.34 ml |

The reaction mixture was stirred at 0° C. for 24 hours while maintaining a dry nitrogen atmosphere. The polymerization was quenched and the polymer worked up as described in Example 1.

The polymer, 5.04 g (yield: 96%) of white powdery material, had an inherent viscosity 0.50 dl/g (0.1% solution in m-cresol at 25° C.) and was crystalline upon X-ray examination.

The DSC trace showed a crystalline melting peak at 152° C. (fusion enthalpy 21 J/g) with crystallization peak at 141° C.. Observations on the hot stage microscope between crossed polarizers showed birefringence up to 300° C..

I claim:

1. Copolyethers displaying anisotropic liquid-crystal properties in the molten state consisting of copolymers of 7-oxa-bicyclo(2,2,1)heptane, optionally substituted in the 2-, 3-, 5-, and/or 6-positions with alkyl radicals having 1 or 2 carbon atoms, with one or more single ring cycloaliphatic ether(s) having the formulae:

wherein R$_1$ and R$_2$ are equal to or different from each other and represent H, a halogen, an alkyl radical having 1 or 2 carbon atoms in which one or more hydrogen atoms are optionally replaced by halogens, a phenyl radical or a substituted phenyl radical, and wherein the 7-oxa-bicyclo(2,2,1)heptane is present in a molar amount from 80 to 98% in said copolyethers.

2. Copolyethers according to claim 1, wherein R$_1$ and R$_2$ are H, CH$_3$ and/or C$_2$H$_5$.

3. Copolyethers according to claim 1, having an intrinsic viscosity in 60/40 (by volume) phenol/tetrachloroethane, of at least 0.1 dl/g.

4. Process for preparing the copolyethers according to claim 1, comprising reacting 7,oxa-bicyclo(2.2.1)heptane with the cyclic ethers having the general formula (II) in the presence of a cationic polymerization catalyst.

5. Copolyethers according to claim 1, having an intrinsic viscosity in 60/40 (by volume) phenol/tetrachlorethane, of from 0.3 to 5 dl/g.

6. Copolyethers as defined in claim 1, wherein the single ring cycloaliphatic ether is oxycyclopropane.

7. Copolyethers as defined in claim 1, wherein the single ring cycloaliphatic ether is epichlorohydrin.

* * * * *